US007689570B2

(12) United States Patent
Fuchs

(10) Patent No.: US 7,689,570 B2
(45) Date of Patent: Mar. 30, 2010

(54) DYNAMIC SORTING OF VIRTUAL NODES

(75) Inventor: Christian Fuchs, Wiesloch (DE)

(73) Assignee: SAP AG, Walldorf (DE)

( * ) Notice: Subject to any disclaimer, the term of this patent is extended or adjusted under 35 U.S.C. 154(b) by 391 days.

(21) Appl. No.: 11/024,525

(22) Filed: Dec. 28, 2004

(65) Prior Publication Data

US 2006/0143205 A1  Jun. 29, 2006

(51) Int. Cl.
*G06F 17/30* (2006.01)
(52) U.S. Cl. .......................... 707/100; 707/1; 707/102; 707/104.1; 715/853; 715/854; 715/855; 715/856; 715/857; 715/858; 715/859; 715/860; 715/861
(58) Field of Classification Search ........................ None
See application file for complete search history.

(56) References Cited

U.S. PATENT DOCUMENTS

| 5,801,702 | A | * | 9/1998 | Dolan et al. ................. | 715/854 |
| 5,923,328 | A | * | 7/1999 | Griesmer ..................... | 715/854 |
| 5,977,971 | A | * | 11/1999 | Guzak et al. ................. | 715/853 |
| 5,983,232 | A | * | 11/1999 | Zhang ......................... | 707/102 |
| 6,111,579 | A | * | 8/2000 | Alimpich et al. ............. | 715/853 |
| 6,147,687 | A | * | 11/2000 | Wanderski ................... | 715/853 |
| 6,441,835 | B1 | * | 8/2002 | Pazel ........................... | 715/769 |
| 7,197,701 | B2 | * | 3/2007 | Hofmann ..................... | 715/273 |
| 7,496,583 | B2 | * | 2/2009 | Moore et al. ................. | 707/100 |
| 7,509,589 | B2 | * | 3/2009 | Hallisey et al. .............. | 715/853 |
| 2004/0230599 | A1 | * | 11/2004 | Moore et al. ................. | 707/102 |
| 2004/0230917 | A1 | * | 11/2004 | Bales et al. .................. | 715/854 |
| 2004/0267694 | A1 | * | 12/2004 | Sakai et al. .................. | 707/1 |

* cited by examiner

*Primary Examiner*—Tim T. Vo
*Assistant Examiner*—Hasanul Mobin
(74) *Attorney, Agent, or Firm*—Blakely Sokoloff Taylor & Zafman LLP

(57) ABSTRACT

Properties of real nodes are selected by which to organize the real nodes as leaf nodes in a tree graph. A number of virtual nodes are provided, each representing a value of a selected property for at least one of the real nodes. The virtual nodes and real nodes are organized into the tree graph, the virtual nodes positioned along branches starting at a root node and ending at a real node, the virtual nodes in a unique path from the root node to a real node representing the values of the selected properties for the real node. The tree graph is displayed, and can be reconfigured by dragging and dropping a virtual node to a different level in the hierarchy of the tree graph.

20 Claims, 3 Drawing Sheets

DYNAMIC SORTING OF VIRTUAL NODES

BACKGROUND

1. Field of the Invention

This invention relates generally to organizing data. In particular, the invention relates to changing the organization and display of information such as a collection of files or data objects.

2. Description of the Related Art

Hierarchical tree graphs often are used to display information. For example, a computing system may display a set of files or data objects in the form of a tree graph in a graphical user interface window of a display device of the computing system. Typically, however, the relationship of the files or data objects being displayed is fixed by an underlying mathematical tree that structures the organization of the information in a data structure or storage medium accessible by the computing system, for example, as might be used by a file or storage system of the computing system. Thus, the tree graph cannot be readily changed without changing the relationship of the files or data objects in the underlying file or storage system.

SUMMARY

Real nodes, such as data objects or files, organized in a hierarchical tree graph, are reorganized based on properties of real nodes. Virtual nodes represent values of selected properties for the real nodes. The virtual nodes and real nodes are organized into the tree graph. The virtual nodes are positioned along branches starting at a root node and ending at a real node and form a unique path from the root node to a real node. The virtual nodes in the path represent the values of the selected properties for the real node at the end of the path. The tree graph can be reorganized by moving a virtual node to a different level in the hierarchy of the tree graph.

BRIEF DESCRIEPTION OF THE DRAWINGS

The claims set forth the embodiments of the invention with particularity. The embodiments of the invention, together with its advantages, may be best understood from the following detailed description taken in conjunction with the accompanying drawings in which:

DETAILED DESCRIPTION

Figure 1:
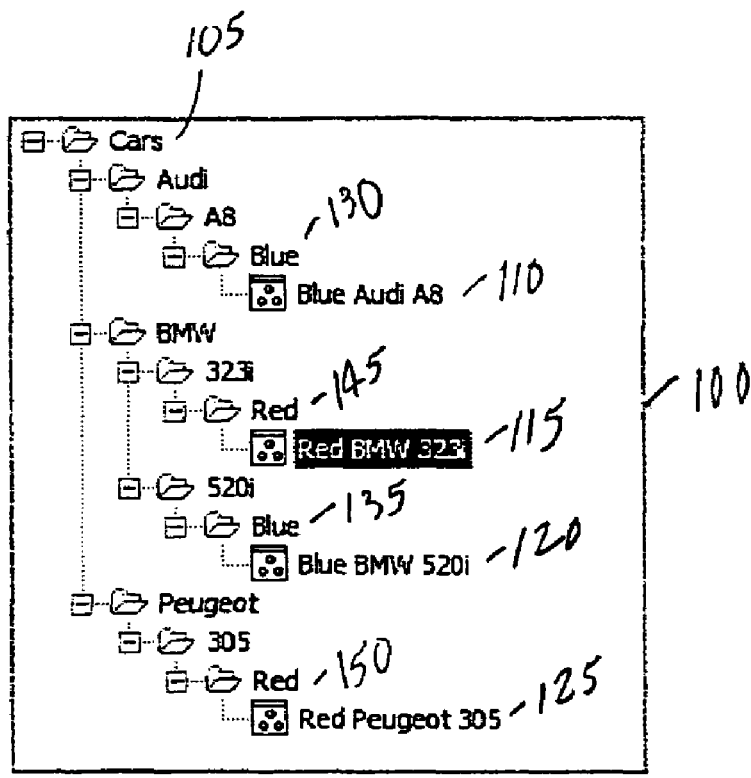
FIG. 1 is a block diagram of an aspect of an embodiment of the present invention.

The invention uses a tree graph for the organization, display, and reorganization of elements of information. A tree graph comprises elements and segments connecting the elements. Herein, the segments may also be referred to as branches, and the elements of information referred as nodes. The lowest, or most subordinate branches in the tree graph, along with the nodes at the end the branches, are referred to as the leaf nodes or leaves.

In the invention, there are two types of nodes in the tree graph: virtual nodes and real nodes. A real node comprises data, and a virtual node comprises metadata describing the data. More particularly, each real node represents an element of information, and in one embodiment of the invention is a leaf node in the tree graph, while a virtual node is associated with a value of a property of an element of information, and is a non-leaf node in the tree graph. In another embodiment of the invention, a real node need not be a leaf node, for example, a real node may include information about a Java class file, and may be expandable to include nodes that contain elements of information about classes or methods of the Java class file.

Examples of an element of information include but are not limited to a file, a data structure, and a data object. A real node may be represented in the tree graph as an icon or other graphical or textual based symbol that represents the element of information. Hereafter, when referring to a real node, it should be understood to mean either a representation of the element of information, or the element of information itself, depending on the appropriate context in which the term is used.

As stated above, a virtual node is associated with a property of an element of information, that is, a virtual node represents a value of the property of an element of information. For example, an element of information may be a text file containing this document in a file system of a computing system. One property of the text file may be its creation date. A virtual node associated with the creation date of the text file may represent the actual date the text file was created. Importantly, if two files are created on the same date, regardless of whether other properties are similar between the two files, the same virtual node may represent the creation date of both files, since both files share the same value for this property in common with the files. Alternatively, depending on the organization of the virtual nodes in the tree graph, one virtual node may represent the creation date of one file, while another, duplicate, virtual node may represent the creation date of the other file.

There are two types of properties associated with an element of information, that is, a real node: attributes of the real node, and contents of the real node. In the above-described example, the creation date of a file is an example of an attribute of a real node. The textual data comprising the file is an example of the content of a real node. However, it should be noted that content of the real node may be treated as an attribute as well. For example, the first line of text data in a file may be treated as an attribute of the file. Attributes of a real node may include, but are not limited to, in the case of a file, the file's name, type, location, size, creation date, last modified date, last accessed date, archive and index attributes, compression attributes, encryption attributes, permissions, owner, author, subject, revision number, last printed date, application name used to access or execute the file (if applicable), category, keywords and comments. Attributes of a data object may be but are not limited to the data object's name, class/interface, number, interfaces, type, length and contents. Contents of a real node, in the case of a file, may include keywords, phrases, and content type (e.g., ASCII text, binary data, audio, video, etc.).

In one embodiment of the invention, a virtual node may represent a range of attribute values, e.g., monetary values less than $10,000, $10,000 to $20,000, or greater than $20,000; or range of dates: 1998, 1998-2000, after 2000. As other examples, a virtual node may represent a union of attributes, such as the color green represents the union of the primary colors red and yellow. It is also appreciated that the attributes for an element of information may be split up or separated across two or more virtual nodes, for example, a date may be separated into its components year, month, day, each component represented by a different virtual node.

With reference to FIG. 1, a set 105 of four objects, in this case, cars, is illustrated. Real nodes 110, 115, 120 and 125 respectively represent the cars in the set:

Blue Audi A8
Red BMW 323i
Blue BMW 520i
Red Peugeot 305

Each real node shares properties, in this case, attributes, in common with the other real nodes. The attributes vendor, model and color, for example, define each real node. It should be appreciated that the properties associated with a particular real node need not be common among the other the real nodes. For example, in FIG. 1, the attribute manufacturer's suggested retail price (MSRP) may be provided for one or at most a subset of the real nodes. Other attributes may be provided as well, such as dealer invoice, model year, etc. A user can select at 805 those properties, whether attributes or contents of a real node, by which to categorize, or sort, the real nodes, based, for example, on user preferences and interests. Virtual nodes representing the selected properties of the real nodes are created.

As can be seen FIG. 1, virtual nodes represent the values of the selected attributes vendor, model and color. The virtual nodes are depicted as expanded folders. The virtual nodes and real nodes are organized and displayed in a tree graph 100 with the virtual nodes positioned at forks in the branches of the tree graph, beginning at the root node (which defines the set of real nodes) and ending at the real nodes. In another embodiment of the invention, the virtual nodes need not be positioned solely between the root node and real nodes—virtual nodes may be positioned between non-leaf positioned real nodes at different levels in the hierarchy. In any case, the virtual nodes in the unique path from the root node to a particular real node represent the values of the selected attributes for the real node. As an example, the virtual nodes Audi, A8, and Blue are connected by branches from root node 105 to real node 110 and represent the values for the respective selected attributes of vendor, model and color for the real node 110. Likewise, the virtual nodes BMW, 323i, and Red are connected by branches from root node 105 to real node 115 and represent the values for the selected attributes for real node 115. Similarly, branches connect root node 105, virtual nodes BMW, 520i, and Blue, and real node 120.

FIG. 1 illustrates virtual nodes associated with a particular selected property of a real node at the same level in the hierarchy of the tree graph 100. For example, the virtual nodes Audi, BMW and Peugeot are associated with the selected property "vendor" and are all positioned at the first level below the root node in the hierarchy of the tree graph 100. Likewise, virtual nodes A8, 323i, 520i and 205 are associated with the selected property "model" positioned two levels below the root node.

Zero or more duplicate virtual nodes may exist in the tree graph 100. For example, referring again to the virtual nodes at the first two levels of the tree graph 100, no duplicate virtual nodes exist—the virtual nodes each represent unique values of the selected properties vendor and model. However, the third level in the hierarchy includes two virtual nodes having the value Blue for the property "color", and two other virtual nodes having the value Red for the property "color". As can be appreciated, the virtual nodes are not actual elements of information like real nodes but rather provide criteria by which the real nodes may be categorized and sorted. Thus, depending on where in the hierarchy the virtual nodes are positioned it may be appropriate or necessary to maintain duplicate virtual nodes, that is, virtual nodes representing the same value of the selected property, at a level in the hierarchy of the tree graph 100, as is the case in the last non-leaf level in the tree graph of FIG. 1.

While duplicate virtual nodes may exist in the tree graph 100, it should be noted that the duplicate virtual nodes represent values of attributes for different real nodes. Take, for example, virtual node 130 representing the value Blue for the attribute color, and duplicate virtual node 135 also representing the value Blue for the attribute color. In the first instance, the virtual node represents the color value for the real node 110, while in the latter instance the virtual node represents the same color value for the real node 120.

FIG. 1 depicts a tree graph 100 as it might appear in a graphical user interface (GUI) window of a display device for a computing system. The root node 105 and all nodes but the leaf nodes, that is, all virtual nodes, are depicted as folders. The real nodes are depicted as non-expandable elements at the most subordinate level, that is, at the leaves of the tree graph. In FIG. 1, all the folders are expanded, or open, in which case, the subordinate virtual nodes or real nodes, as the case may be, are also displayed. If a folder is closed, all subordinate folders and the real node under such folder are hidden from view in the display. In an alternative embodiment, real nodes need not be non-expandable, that is, real nodes contain information about other, subordinate nodes. Such real nodes may be expandable elements and be depicted as folders.

While the display of the tree graph in FIG. 1 depicts open or closed folders for virtual nodes, it is appreciated that other icons or symbols may be used to represent expandable/expanded virtual nodes. For example, a sphere may represent a virtual node hiding one or more subordinate virtual nodes and/or a real node, whereas a circle may represent an expanded virtual node exposing one or more subordinate virtual nodes and/or a real node. Different shapes, colors, or a combination of both, may also be used to readily convey to the viewer the state of the tree graph.

Figure 2:
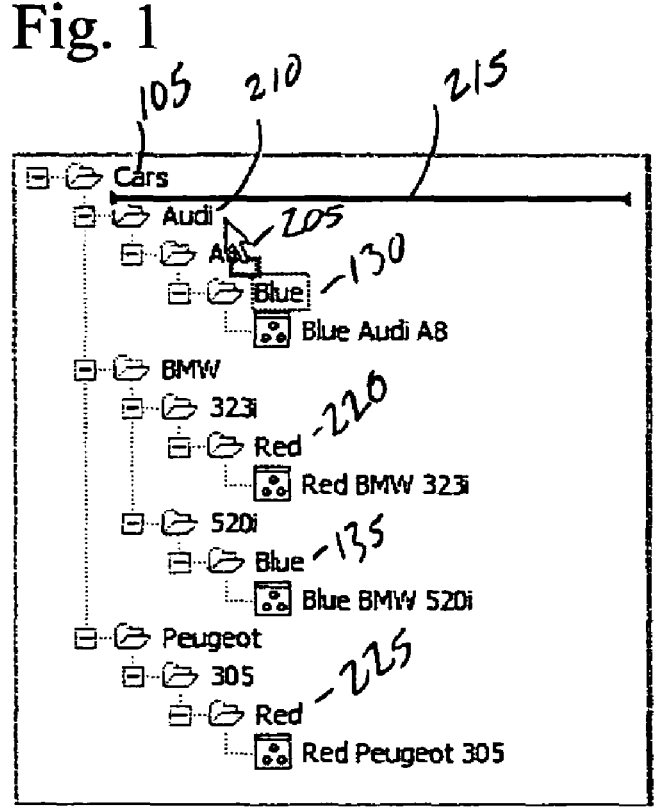
FIG. 2 is a block diagram of an aspect of an embodiment of the present invention.

FIG. 1 lists objects, in this case, cars, according to different criteria. The cars are sorted first by vendor (the first level of virtual nodes below the root node), then by model (the second level of virtual nodes) and finally by color (the third level of virtual nodes). In FIG. 2, if the viewer wants to sort and view the objects according to different criteria, for example, sort by color, then vendor, then model, the view may select a third level virtual node such as virtual node Blue 130, then drag and drop the virtual node 130 above the second level virtual node A8 205 and first level virtual node Audi 210 at position 215, below the root node 105. In one embodiment of the invention, the display indicates to where the viewer drags the virtual node by inserting a line 215 between the root node Cars and first level virtual node Audi 210.

Figure 3:
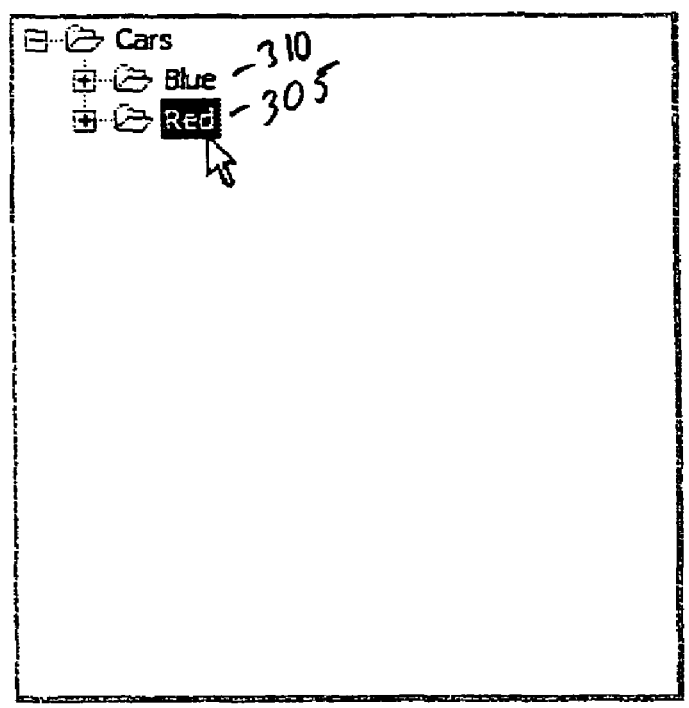
FIG. 3 is a block diagram of an aspect of an embodiment of the present invention.
Figure 4:
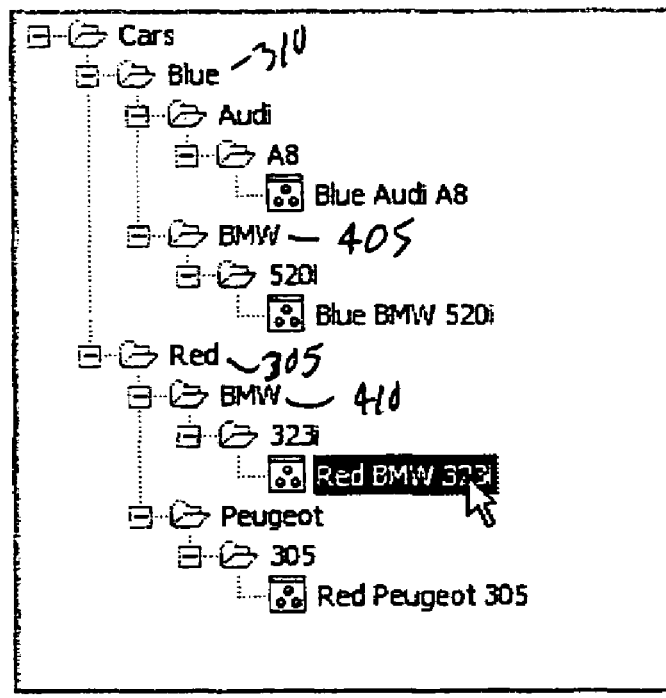
FIG. 4 is a block diagram of an aspect of an embodiment of the present invention.

As seen in FIGS. 3 and 4, an embodiment of the invention receives input from the viewer's drag and drop operation and positions not only the virtual node 130, but all the other virtual nodes at the same level, and associated with the property color (virtual nodes 220, 135 and 225), at the first level in the hierarchy of the tree graph. Dropping the virtual node 130 over the virtual node 210 causes a reorganization of the tree graph as shown in FIG. 3, with the folders closed, and in FIG. 4, with the folders expanded.

Note that in FIG. 1, there are two virtual nodes having a value of Blue for the property color—virtual nodes 130 and 135, and two virtual nodes 145 and 150 having a value of Red for the property color. Contrast FIG. 1 with FIG. 4, in which, after reorganizing the virtual nodes in FIG. 1 based on the viewer's input (the drag and drop operation in FIG. 2), there is only one red virtual node 305 and one blue virtual node 310. On the other hand, FIG. 4 depicts two virtual nodes having a value of BMW for the property vendor—virtual nodes 405 and 410 versus only one BMW virtual node in FIG. 1. These figures illustrate that the virtual nodes used for sort criteria, e.g., vendor, model and color in the example described above, are not necessarily unique.

Figure 5:
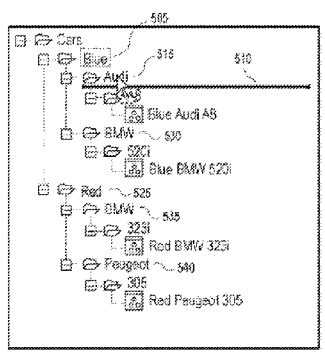
FIG. 5 is a block diagram of an aspect of an embodiment of the present invention.
Figure 6:
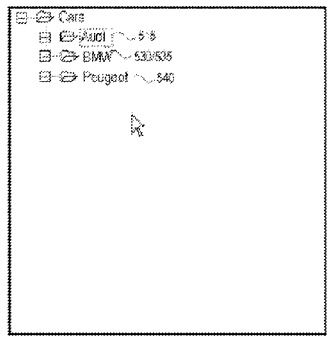
FIG. 6 is a block diagram of an aspect of an embodiment of the present invention.
Figure 7:
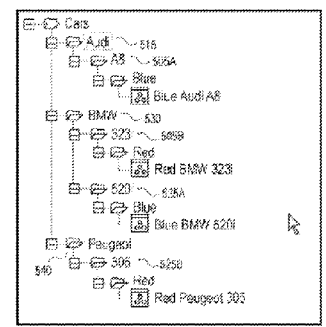
FIG. 7 is a block diagram of an aspect of an embodiment of the present invention.

While FIG. 4 illustrates dragging a virtual node from a subordinate level, and all other virtual nodes at the same level, to a higher level in the hierarchy of the tree graph, FIG. 5 illustrates dragging a virtual node 505 and its peer virtual node 525 at the same level to a subordinate level below target virtual node 515 as indicated by line 510 in FIG. 5. FIG. 6 illustrates the resulting tree graph in unexpanded form. FIG. 7 depicts the tree graph of FIG. 6 with the virtual nodes expanded—the cars are now organized by vendor, then color and finally model, as opposed to FIG. 1 in which the cars were organized by vendor, then model, and finally color.

It should be appreciated that it is also possible to add virtual nodes/sort criteria to the tree graph. In the above example, criteria such as manufacturer's suggested retail price (MSRP), or fuel economy, may be added. There are a number of ways in which the viewer could provide this information via a user interface such as a GUI. For example, the additional criteria could be added by way of a drop down menu in a toolbar that lists all known or possible properties for the real nodes in the tree graph. The viewer could check a box associated with a particular property to add virtual nodes to the tree graph for values of such property. Those boxes that are checked in the pull-down menu indicate the associated properties for which virtual nodes are included in the tree graph. In addition the viewer may be able to provide a priority or level in the tree graph at which the virtual nodes associated with added property are inserted. Alternatively, any new virtual nodes in the tree graph created as a result of selecting a new sort criteria may be added at the level in the hierarchy of the tree graph immediately below the root node.

Alternatively, if the viewer decides to remove a sort criteria from the tree graph, deselecting a box already checked in a pull down menu would serve to remove any virtual nodes in the tree graph associated with such sort criteria. Any virtual nodes at a level in the hierarchy of the tree graph immediately below the level at which the virtual nodes associated with the deselected sort criteria are remove may be moved up one level and connected to the branches of the tree graph descending from the virtual nodes at a level above the level at which the virtual nodes were removed.

It should be appreciated that while just one example is provided above as to an interface that may be used to add and/or remove virtual nodes from the tree graph, other common user interface techniques could equally be used. For example, a menu could also be realized as a context menu displayed by selecting any virtual node associated with a property. The context menu may provide a "hide" function that removes all virtual nodes associated with a deselected property associated with the virtual node on which the context menu is opened. As another example, the DELETE key on a keyboard may be pressed to provide input to remove a virtual node category.

Additionally, in the context menu, an "add additional sort criteria" action may invoke a dialog with a list of sort criteria (properties) that are not presently being used in the tree graph. Finally, a "sort criteria" action may invoke a dialog that lists all sort criteria, each with an associated check box, allowing the viewer to add and remove multiple sort criteria at a time.

Numerous specific details are set forth in this description in order to provide a thorough understanding of the embodiments of the invention. It is apparent, however, to one skilled in the art that the invention may be practiced without some of these specific details. In other instances, well-known structures and devices have been shown in block diagram form to avoid obscuring the underlying principles of the invention.

Various embodiments of the invention may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link.

What is claimed is:

1. A method, comprising:
    receiving a user input to move a virtual node representing a first value of a first real node from a first hierarchy level in a tree graph to a second hierarchy level, the first value of the first real node corresponding to a first property, the tree graph further including;
    a virtual node representing a second value of the first real node and included in the second hierarchy level of the tree graph, the second value of the first real node corresponding to a second property,
    a first branch ending in the first real node,
    a second branch ending in a second real node, the second real node including first and second values respectively corresponding to the first and second properties,
    a virtual node representing the first value of the second real node and included in the first hierarchy level of the tree graph,
    a virtual node representing the second value of the second real node and included in the second hierarchy level of the tree graph, and
    a root node;
    identifying the virtual node representing the first value of the second real node and the virtual node representing the second value or the second real node; and
    organizing the root node, the real nodes, and the virtual nodes of the tree graph, wherein,
        the virtual node representing the second value of the first real node and the virtual node representing the second value of the second real node are moved from the second hierarchy level, and the virtual node representing the first value of the first real node and the virtual node representing the second value of the second real node are moved from the first hierarchy level.

2. The method of claim 1, further comprising receiving user input to add one or more properties by which to organize the real nodes as leaf nodes in the tree graph.

3. The method of claim 1, wherein the first and second real nodes are data objects and the properties of each data object include attributes of the data object, contents of the data object, or attributes and contents of the data object.

4. The method of claim 3, wherein attributes of each data object includes one or more of the data object's name, class, number, interfaces, type, length and contents.

5. The method of claim 1, wherein the first and second real nodes are files and the properties of each file include attributes of the file, contents of the file, or attributes and contents of the file.

6. The method of claim 5, wherein attributes of each file includes one or more of the file's name, type, location, size, creation date, last modified date, last accessed date, archive and index attributes, compression attributes, encryption attributes, permissions, owner, author, subject, revision number, last printed date, application name used to access or execute the file, category, keywords and comments.

7. The method of claim 1, further comprising displaying the tree graph.

8. The method of claim 7, wherein displaying the tree graph comprises:

displaying the root node and all virtual nodes as expandable components in the hierarchy of the tree graph; and displaying the real nodes as elements of the most subordinate level of expandable components in the hierarchy of the tree graph.

9. The method of claim 7, wherein displaying the root node and all virtual nodes as expandable components in the hierarchy of the tree graph comprises displaying the root node and all virtual nodes as expandable folders.

10. The method of claim 1, wherein receiving the user input comprises a drag-and-drop operation.

11. The method of claim 10, wherein the drag-and-drop operation comprises:

selecting the virtual node representing the first value of the first real node at the first level in the hierarchy of the tree graph, dragging said virtual node to the second level in the hierarchy of the tree graph, and dropping the virtual node at the second level in the hierarchy of the tree graph.

12. The method of claim 11, wherein the second level is a higher level in the tree graph relative to the first level.

13. The method of claim 11, wherein the second level is a subordinate level relative to the first level.

14. An article of manufacture comprising a computer-readable storage medium that provides instructions that, when executed by a processor, cause the processor to:

receive a user input to move a virtual node representing a first value of a first real node from a first hierarchy level in a tree graph to a second hierarchy level, the first value of the first real node corresponding to a first property, the tree graph further including:

virtual node representing a second value of the first real node and included in the second hierarchy level of the tree graph, the second value of the first real node corresponding to a second property, a first branch ending in the first real node, a second branch ending in a second real node, the second real node including first and second values respectively corresponding to the first and second properties, a virtual node representing the first value of the second real node and included in the first hierarchy level of the tree graph, a virtual node representing the second value of the second real node and included in the second hierarchy level of the tree graph, and a root node;

identify the virtual node representing the first value of the second real node and the virtual node representing the second value of the second real node; and organize the root node, the real nodes, and the virtual nodes of the tree graph, wherein, the virtual node representing the second value of the first real node and the virtual node representing the second value of the second real node are moved from the second hierarchy level, and the virtual node representing the first value of the first real node and the virtual node representing the second value of the second real node are moved from the first hierarchy level.

15. The article of manufacture of claim 14, wherein the computer-readable storage medium provides instructions that, when executed by a processor, cause the processor to display the tree graph.

16. The article of manufacture of claim 14, wherein the instructions to organize the root node, the real nodes and the virtual nodes of the tree graph include instructions that, when executed by a processor, cause the processor to generate one or more duplicate virtual nodes or eliminate one or more duplicate virtual nodes.

17. The method of claim 1, wherein organizing the root node, the real nodes and the virtual nodes of the tree graph includes generating one or more duplicate virtual nodes or eliminating one or more duplicate virtual nodes.

18. The method of claim 1, further comprising receiving user input to remove one or more properties by which the real nodes are organized.

19. The method of claim 1, wherein the virtual node representing the first value of the first real node and the virtual node representing the first value of the second real node are the same node.

20. The method of claim 1, wherein the virtual node representing the second value of the first real node and the virtual node representing the second value of the second real node are the same node.

* * * * *